United States Patent
Choi et al.

(10) Patent No.: US 8,311,139 B2
(45) Date of Patent: *Nov. 13, 2012

(54) WIRELESS COMMUNICATION SYSTEM WITH MULTIPLE TRANSMISSION ANTENNAS USING PILOT SUBCARRIER ALLOCATION

(75) Inventors: Jin Soo Choi, Anyang-Si (KR); Han Gyu Cho, Anyang-Si (KR); Bin Chul Ihm, Anyang-Si (KR); Wook Bong Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,458

(22) Filed: Jan. 10, 2012

(65) Prior Publication Data

US 2012/0106534 A1 May 3, 2012

Related U.S. Application Data

(63) Continuation of application No. 12/427,422, filed on Apr. 21, 2009, now Pat. No. 8,126,071.

(60) Provisional application No. 61/078,342, filed on Jul. 4, 2008.

(30) Foreign Application Priority Data

Feb. 5, 2009 (KR) .................. 10-2009-0009389

(51) Int. Cl.
   *H04L 27/28* (2006.01)
(52) U.S. Cl. .................... 375/260; 375/285
(58) Field of Classification Search ............ 375/260, 375/285
   See application file for complete search history.

(56) References Cited

U.S. PATENT DOCUMENTS

| | | |
|---|---|---|
| 2008/0095255 A1 | 4/2008 | Tanaka et al. |
| 2009/0067522 A1 | 3/2009 | Kwak et al. |
| 2009/0067534 A1 | 3/2009 | Kwak et al. |
| 2009/0225722 A1 | 9/2009 | Cudak et al. |
| 2009/0257516 A1 | 10/2009 | Hsieh et al. |
| 2009/0257520 A1 | 10/2009 | Lin et al. |
| 2009/0262696 A1 | 10/2009 | Wei et al. |
| 2009/0262848 A1 | 10/2009 | Choi et al. |
| 2011/0026482 A1 | 2/2011 | Li et al. |
| 2011/0096867 A1 | 4/2011 | Kang et al. |

FOREIGN PATENT DOCUMENTS

| | | |
|---|---|---|
| CN | 101057474 A | 10/2007 |
| JP | 2010-527165 A | 8/2010 |
| JP | 2010-539780 A | 12/2010 |
| KR | 10-2005-0041857 A | 5/2005 |
| KR | 10-0657506 B1 | 12/2006 |
| WO | WO 01/76110 A2 | 10/2001 |

(Continued)

OTHER PUBLICATIONS

Choi et al., "Physical Resource Allocation Unit in IEEE 802.16m Downlink", IEEE 802.16 Broadband Wireless Access Working Group, IEEE C802.16m-08/152rl, XP007915451, Mar. 10, 2008, pp. 1-11.

(Continued)

*Primary Examiner* — Shuwang Liu
*Assistant Examiner* — David Huang
(74) *Attorney, Agent, or Firm* — Birch, Stewart, Kolasch & Birch, LLP

(57) ABSTRACT

A method for allocating pilot subcarriers in a resource block for a wideband wireless mobile communication system using an orthogonal frequency division multiplexing (OFDMA) modulation is discussed. In this method, pilot subcarriers are allocated in the resource block so that a group of consecutive data subcarriers separated from adjacent other group of consecutive data subcarriers by the pilot subcarriers has even number of subcarriers within an OFDMA symbol.

10 Claims, 9 Drawing Sheets

FOREIGN PATENT DOCUMENTS

| WO | WO 2004/002011 A1 | 12/2003 |
|---|---|---|
| WO | 2006/071050 A1 | 7/2006 |
| WO | WO 2007/036787 A2 | 4/2007 |
| WO | WO 2007/117127 A1 | 10/2007 |

OTHER PUBLICATIONS

Fwu et al., "Proposed Text of DL Physical Layer Section for the IEEE 802.16m Amendment", IEEE 802.16 Broadband Wireless Access Working Group, IEEE C802.16m-08/1443, XP-002631898, Nov. 3, 2008, pp. 1-12.

Murias et al., "802.16m DL PHY Structure Baseline Content Suitable for Use in the 802.16m SDD", IEEE 802.16 Broadband Wireless Access Working Group, IEEE C802.16m-08/517, XP007915435, May 14, 2008, 5 pages.

Rüegg et al., "Uplink Pilot Patterns for IEEE 802.16m", IEEE 802.16 Broadband Wireless Access Working Group, IEEE C802.16m-08/344r1, XP-002631897, May 15, 2008, pp. 1-5.

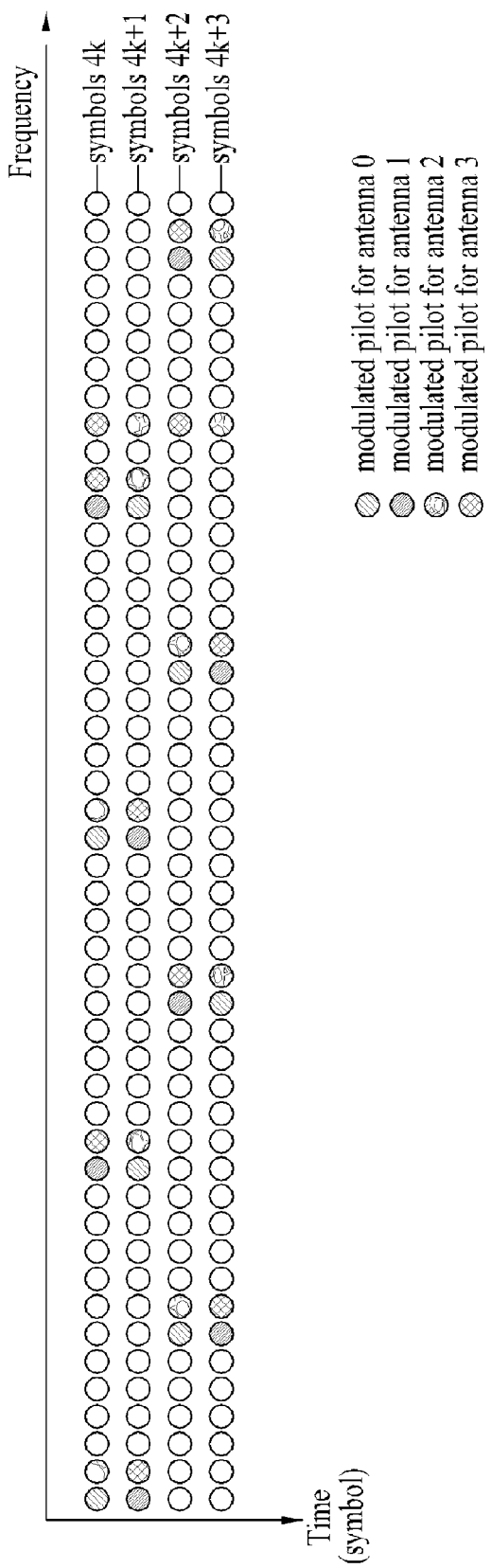

FIG. 7B
Related Art

|     | $P_0$ |     |     | $P_0$ |     |     |
|-----|-------|-----|-----|-------|-----|-----|
|     | $P_1$ |     |     | $P_1$ |     |     |
|     |       |     |     |       |     |     |
|     |       | $P_0$ |     |     | $P_0$ |     |
|     |       | $P_1$ |     |     | $P_1$ |     |
|     |       |     |     |       |     |     |
|     |     | $P_0$ |     |     | $P_0$ |   |
|     |     | $P_1$ |     |     | $P_1$ |   |

FIG. 8

| freq.(i) \ time(j) | 0 | 1 | 2 | 3 | 4 | 5 |
|---|---|---|---|---|---|---|
| 0 | $P_0$ | $P_2$ | | | $P_1$ | $P_3$ |
| 1 | | | | | | |
| 2 | | | | | | |
| 3 | | | | | | |
| 4 | | | | | | |
| 5 | $P_1$ | $P_3$ | | | $P_0$ | $P_2$ |
| 6 | | | | | | |
| 7 | | | | | | |
| 8 | | | | | | |
| 9 | | | | | | |
| 10 | | | | | | |
| 11 | | | | | | |
| 12 | $P_2$ | $P_0$ | | | $P_3$ | $P_1$ |
| 13 | | | | | | |
| 14 | | | | | | |
| 15 | | | | | | |
| 16 | | | | | | |
| 17 | $P_3$ | $P_1$ | | | $P_2$ | $P_0$ |

WIRELESS COMMUNICATION SYSTEM WITH MULTIPLE TRANSMISSION ANTENNAS USING PILOT SUBCARRIER ALLOCATION

CROSS-REFERENCE TO RELATED APPLICATIONS

This application is a Continuation of U.S. application Ser. No. 12/427,422, filed on Apr. 21, 2009, now U.S. Pat. No. 8,126,071 which claims priority under 35 U.S.C. §119(a) to Korean Application No. 10-2009-0009389, filed in the Republic of Korea on Feb. 5, 2009, and under 35 §U.S.C. 119(e) to U.S. Provisional Application No. 61/078,342, filed on Jul. 4, 2008. The entire contents of all the above applications are hereby incorporated by reference herein in their entirety.

BACKGROUND OF THE INVENTION

1. Field of the Invention

The present invention relates to a wireless communication system. In particular, the present invention relates to a method of allocating pilot subcarriers in the wireless communication system including a multiple-input multiple-output (MIMO) antenna system.

2. Description of the Related Art

The Institute of Electrical and Electronics Engineers (IEEE) 802.16 standard provides a technology of supporting a broadband wireless access and a protocol. The standardization has been progressed since 1999 and IEEE 802.16-2001 was approved in 2001. This has been established based on a single carrier physical layer called "WirelessMAN-SC". In the IEEE 802.16a which was approved in 2003, "WirelessMAN-OFDM" and "WirelessMAN-OFDMA" were added to a physical layer in addition to "WirelessMAN-SC". After the IEEE 802.16a standard was completed, a revised IEEE 802.16-2004 was approved in 2004. In order to correct bugs and errors of the IEEE 802.16-2004, IEEE 802.16-2004/Cor1 was completed in the form of "corrigendum" in 2005.

A MIMO antenna technology improves data transmission/reception efficiency using multiple transmission antennas and multiple reception antennas. The MIMO technology was introduced in the IEEE 802.16a standard and has been continuously updated.

The MIMO technology is divided into a spatial multiplexing method and a spatial diversity method. In the spatial multiplexing method, since different data is simultaneously transmitted, data can be transmitted at a high speed without increasing the bandwidth of a system. In the spatial diversity method, since the same data is transmitted via multiple transmission antennas so as to obtain diversity gain, reliability of the data is increased.

A receiver needs to estimate a channel in order to restore data transmitted from a transmitter. Channel estimation indicates a process of compensating for distortion of a signal, which occurs by a rapid environment variation due to fading and restoring the transmission signal. In general, for channel estimation, the transmitter and the receiver need to know pilots.

In the MIMO system, a signal experiences a channel corresponding to each antenna. Accordingly, it is necessary to arrange the pilots in consideration of multiple antennas. While the number of pilots is increased as the number of antennas is increased, it is impossible to increase the number of antennas so as to increase a data transfer rate.

In the related art, different pilot allocation structures have been designed and used according to permutation (dispersion/AMC/PUSC/FUSC) methods. This is because the permutation methods are separated from each other along with time axis in the IEEE 802.16e system and thus structures could be differently optimized according to permutation methods. However, if the permutation methods coexist in certain time instance, a unified basic data allocation structure is necessary.

In the related art, since severe pilot overhead occurs, a transfer rate is decreased. In addition, since the same pilot structure is applied to adjacent cells or sectors, collision between the cells or the sectors may occur. Accordingly, there is a need for a method of efficiently allocating pilot subcarriers in the MIMO system.

SUMMARY OF THE INVENTION

An object of the present invention is to provide a method of efficiently allocating pilot subcarriers in wireless communication system including a MIMO system irrespective of uplink/downlink and specific permutation schemes. The present invention is applicable to new wireless communication systems such as IEEE 802.16m.

The embodiments of the present invention can be achieved by a number of aspects of the present invention described below.

In an aspect of the present invention, a method of allocating pilot subcarriers in a resource block for a wideband wireless mobile communication system having four (4) transmission antennas using orthogonal frequency division multiple access (OFDMA) modulation, comprises allocating pilot subcarriers to the resource block so that a group of consecutive data subcarriers separated from adjacent other group of consecutive data subcarriers by the pilot subcarriers has even number of subcarriers within an OFDMA symbol.

Preferably, the even number is 4 or 6. Preferably, the resource block has a form of a 18*6 size of matrix structure composed of 18 subcarriers and 6 OFDMA symbols. Preferably, the pilot subcarriers for the four transmission antennas are allocated at the first OFDMA symbols, the second OFDMA symbols, the fifth OFDMA symbols, and the sixth OFDMA symbols, and the pilot subcarriers for the four transmission antennas are not allocated at the third OFDMA symbol and the fourth OFDMA symbol in the resource block. Preferably, four (4) pilot subcarriers are allocated for each of the first OFDMA symbols, the second OFDMA symbols, the fifth OFDMA symbols, and the sixth OFDMA symbols, the four (4) pilot subcarriers comprising a pilot subcarrier for the first transmission antenna, a pilot subcarrier for the second transmission antenna, a pilot subcarrier for the third transmission antenna, and a fourth subcarrier for the fourth transmission antenna. Preferably, a part of the pilot subcarriers for the four transmission antennas is used for common pilot, and the other part of the pilot subcarriers for the four transmission antennas is used for dedicated pilot. Preferably, all of the pilot subcarriers for the four transmission antennas are used for common pilot. Preferably, all of the pilot subcarriers for the four transmission antennas is used for dedicated pilot. Preferably, the resource block is repeated in time domain. Preferably, the resource block is repeated in frequency domain.

In another aspect of the present invention, a method of allocating pilot subcarriers in a 18*6 size of resource block for a wideband wireless mobile communication system having four (4) transmission antennas using orthogonal frequency division multiplexing (OFDMA) modulation, comprises: allocating pilot subcarriers to the resource block, wherein, the pilot subcarriers for the first transmission antenna are allocated at two dimensional index of (0,0), (5,4), (12,1), and (17, 5) of the resource block, the pilot subcarriers for the second transmission antenna are allocated at two dimensional index of (0,4), (5,0), (12,5), and (17, 1) of the resource block, the pilot subcarriers for the third transmission antenna are allocated at two dimensional index of (0,1), (5,5), (12,0), and (12, 4) of the resource block, the pilot subcarriers for the fourth transmission antenna are allocated at two dimensional index of (0,5), (5,1), (12,4), and (17, 0) of the resource block, and the index of (i, j) indicates the position of a resource element at (i+1)th subcarrier and (j+1)th OFDMA symbol in the resource block.

Preferably, a part of the pilot subcarriers for the four transmission antennas is used for common pilot, and the other part of the pilot subcarriers for the four transmission antennas is used for dedicated pilot. Preferably, all of the pilot subcarriers for the four transmission antennas is used for common pilot. Preferably, all of the pilot subcarriers for the four transmission antennas is used for dedicated pilot. Preferably, the resource block is repeated in time domain. Preferably, the resource block is repeated in frequency domain.

In still another aspect of the present invention, a wireless communication system having four (4) transmission antennas using orthogonal frequency division multiplexing (OFDMA) modulation for downlink and uplink communication, comprises: a multiple-input multiple-output (MIMO) antenna; an OFDMA modulator operably connected to the MIMO antenna; and a processor operably connected to the OFDMA modulator, wherein the processor is configured to allocate pilot subcarriers to a 18*6 size of resource block composed of 18 subcarriers and 6 OFDMA symbols, so that a group of consecutive data subcarriers separated from adjacent other group of consecutive data subcarriers by the pilot subcarriers has even number of subcarriers within an OFDMA symbol.

In still another aspect of the present invention, a wireless communication system having four (4) transmission antennas using orthogonal frequency division multiplexing (OFDMA) modulation for downlink and uplink communication, the wireless communication system comprising: a multiple-input multiple-output (MIMO) antenna; an OFDMA modulator operably connected to the MIMO antenna; and a processor operably connected to the OFDMA modulator, wherein the processor is configured to allocate pilot subcarriers to a 18*6 size of resource block composed of 18 subcarriers and 6 OFDMA symbols, wherein, the pilot subcarriers for the first transmission antenna are allocated at two dimensional index of (0,0), (5,4), (12,1), and (17, 5) of the resource block, the pilot subcarriers for the second transmission antenna are allocated at two dimensional index of (0,4), (5,0), (12,5), and (17, 1) of the resource block, the pilot subcarriers for the third transmission antenna are allocated at two dimensional index of (0,1), (5,5), (12,0), and (12, 4) of the resource block, the pilot subcarriers for the fourth transmission antenna are allocated at two dimensional index of (0,5), (5,1), (12,4), and (17, 0) of the resource block, and the index of (i, j) indicates the position of a resource element at (i+1)th subcarrier and (j+1)th OFDMA symbol in the resource block.

BRIEF DESCRIPTION OF THE DRAWINGS

The accompanying drawings, which are included to provide a further understanding of the invention, illustrate embodiments of the invention and together with the description serve to explain the principle of the invention.

FIG. 7A shows a conventional pilot arrangement of four transmission antennas in FUSC.

FIG. 7B shows a conventional pilot arrangement of two transmission antennas in FUSC.

FIG. 8 shows a pilot subcarrier allocation pattern in a 4-Tx system according to an embodiment of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The following technology may be used in various wireless communication systems. A wireless communication system is widely provided in order to provide various communication services such as voice and packet data. This technology may be used in downlink or uplink. In general, the downlink indicates communication from a base station (BS) to a user equipment (UE) and the uplink indicates communication from the UE to the BS. The BS generally indicates a fixed station communicating with the UE and may also be called a node-B, a base transceiver system (BTS) or an access point. The UE may be fixed or moved and may also be called as a mobile station (MS), a user terminal (UT), a subscriber station (SS) or a wireless device.

Hereinafter, an efficient pilot structure for a new system will be described. The new system will be described concentrating on an IEEE 802.16m system, but the same principle may apply to other systems.

A communication system may be a multiple-input multiple-output (MIMO) system or a multiple-input single-output (MISO) system. The MIMO system uses a plurality of transmission antennas and a plurality of reception antennas. The MISO system uses a plurality of transmission antennas and one reception antenna.

Figure 1:
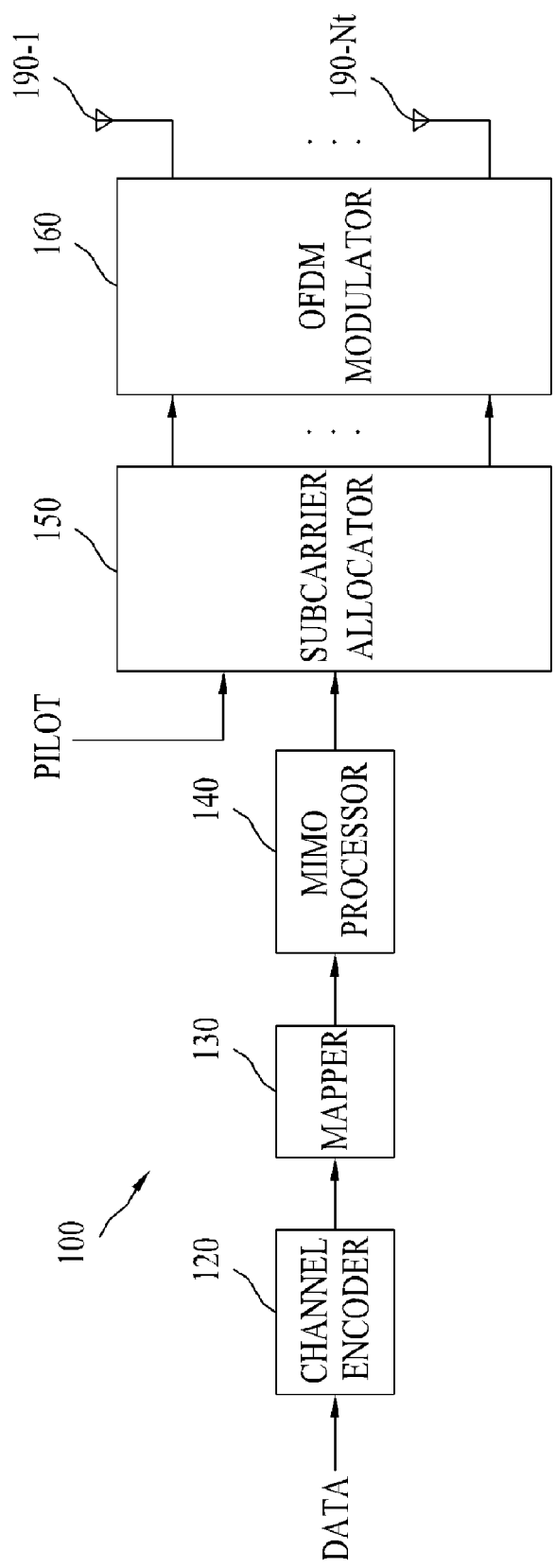
FIG. 1 is a block diagram of a transmitter having multiple antennas.

FIG. 1 is a block diagram of a transmitter having multiple antennas. Referring to FIG. 1, the transmitter 100 includes a channel encoder 120, a mapper 130, an MIMO processor 140, a subcarrier allocator 150 and an orthogonal frequency division multiplexing (OFDMA) modulator 160. The channel encoder 120, mapper 130, MIMO processor 140, and subcarrier allocator 150 may be embodied as separate components or combined in a single processor of the transmitter 100.

The channel encoder 120 encodes an input stream according to a predefined coding method and builds a coded word. The mapper 130 maps the coded word to a symbol representing a position on signal constellation. A modulation scheme of the mapper 130 is not restricted and may include an m-phase shift keying (m-PSK) scheme or an m-quadrature amplitude modulation (m-QAM) scheme.

The MIMO processor 140 processes the input symbol by a MIMO method using a plurality of transmission antennas 190-1, . . . , and 190-Nt. For example, the MIMO processor 140 can perform precoding based on codebook.

The subcarrier allocator 150 allocates the input symbol and pilots to subcarriers. The pilots are arranged according to the transmission antennas 190-1, . . . , and 190-Nt. The pilots and the corresponding pilot locations are known by both the transmitter 100 and a receiver (200 of FIG. 2), which are used for the channel estimation or the data demodulation, and are also called as reference signals.

The OFDMA modulator 160 modulates the input symbol and outputs OFDMA symbols. The OFDMA modulator 160 may perform an inverse fast Fourier transform (IFFT) with respect to the input symbol and further insert a cyclic prefix (CP) after performing the IFFT. The OFDMA symbols are transmitted via the transmission antennas 190-1, . . . , and 190-Nt.

Figure 2:
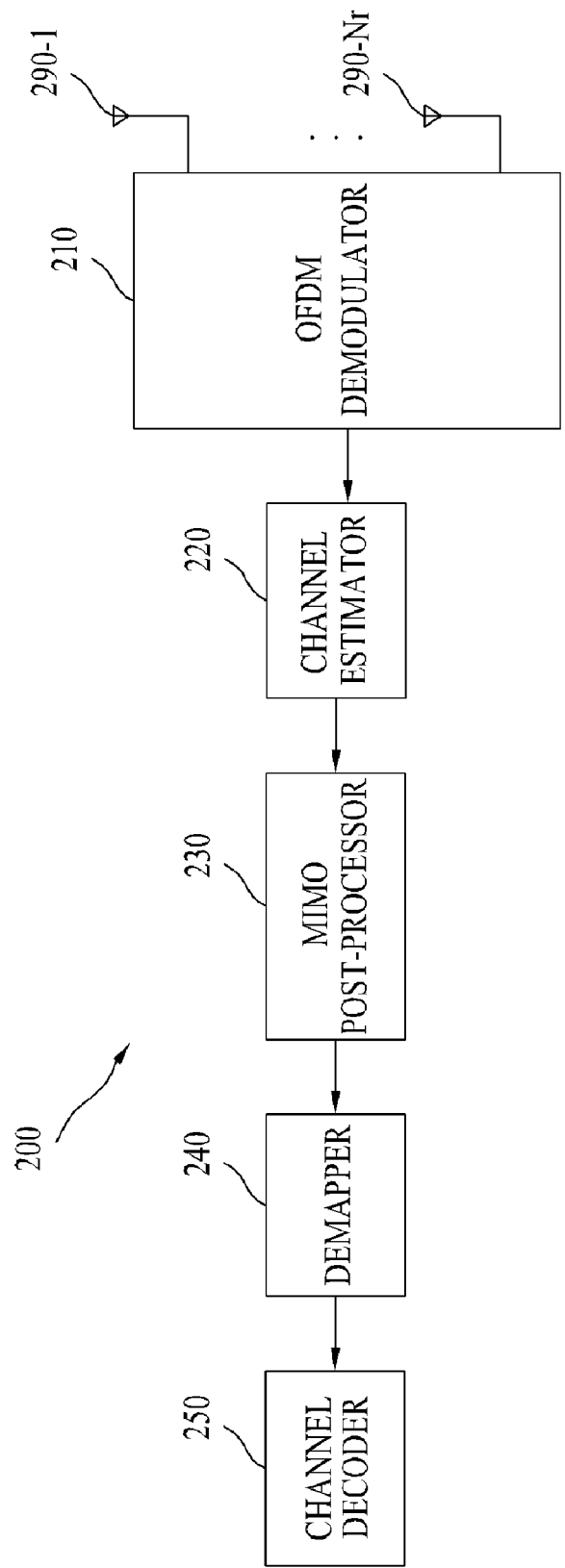
FIG. 2 is a block diagram of a receiver having multiple antennas.

FIG. 2 is a block diagram of a receiver having multiple antennas. Referring to FIG. 2, the receiver 200 includes an OFDMA demodulator 210, a channel estimator 220, an MIMO post-processor 230, a demapper 240 and a channel decoder 250. The channel estimator 220, MIMO post-processor 230, demapper 240 and channel decoder 250 may be embodied as separate components or combined in a single processor of the receiver 200.

Signals received via reception antennas 290-1, . . . , and 290-Nr are Fast Fourier transformed (FFT) by the OFDMA demodulator 210. The channel estimator 220 estimates channels using pilots. Before performing the channel estimation, the pilot symbols are detected in one of the demodulator 210, the channel estimator 220 or another device between the demodulator 210 and the channel estimator 220. The MIMO post-processor 230 performs a post-process corresponding to the MIMO processor 140. The demapper 240 demaps the input symbol to the coded word. The channel decoder 250 decodes the coded word and restores original data.

Figure 3:
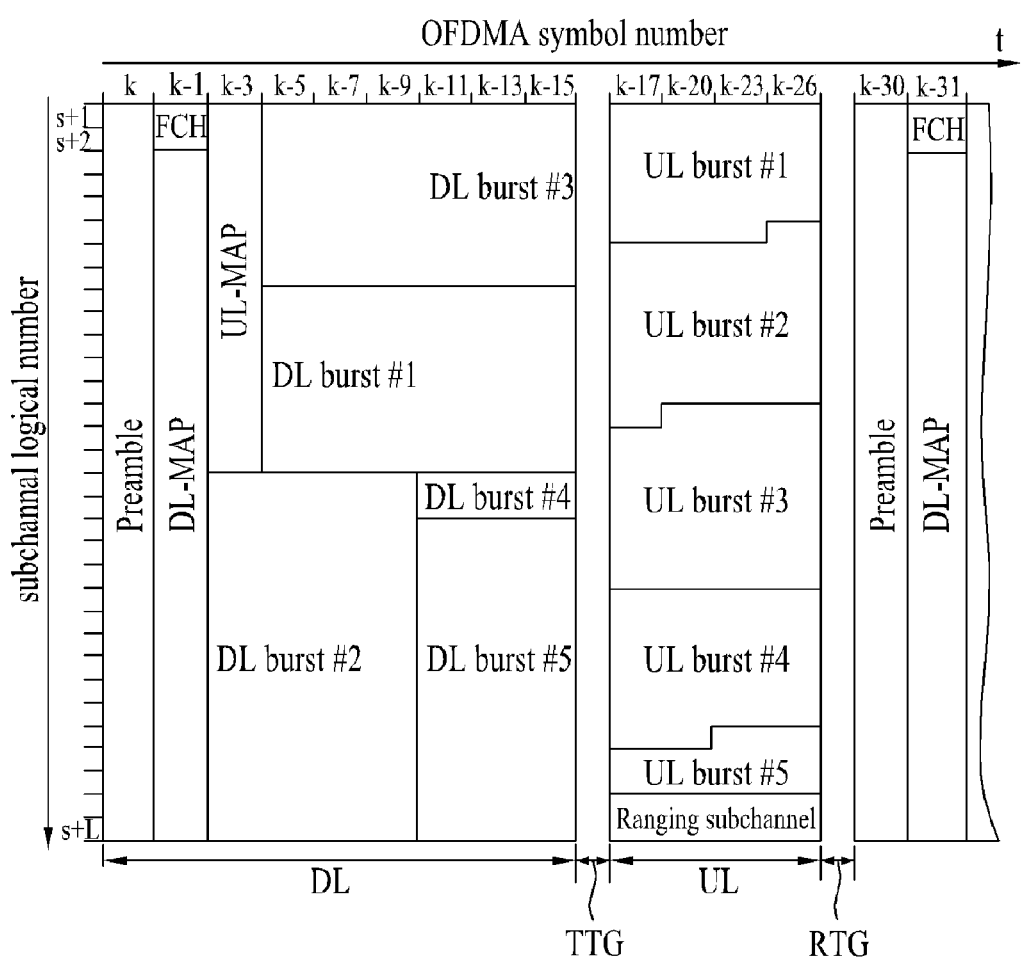
FIG. 3 shows a frame structure.

FIG. 3 is an example of a frame structure. A frame is a data sequence during a fixed time period used by a physical specification, which refers to section 8.4.4.2 of IEEE standard 802.16-2004 "Part 16: Air Interface for Fixed Broadband Wireless Access Systems" (hereinafter, referred to as reference Document 1, the entire contents of which being incorporated herein by reference).

Referring to FIG. 3, the frame includes a downlink (DL) frame and an uplink (UL) frame. Time division duplex (TDD) is a scheme in which the uplink and downlink transmission are separated in time domain but share the same frequency. Normally, the DL frame precedes the UL frame. The DL frame starts in the order of Preamble, Frame Control Header (FCH), Downlink (DL)-MAP, Uplink (UL)-MAP and burst regions (DL burst #1~5 and UL burst #1~5). A guard time for separating the DL frame and the UL frame from each other is inserted at both an intermediate portion of the frame (between the DL frame and the UL frame) and a last portion of the frame (following the UL frame). A transmit/receive transition gap (TTG) is a gap defined between a downlink burst and a subsequent uplink burst. A receive/transmit transition gap (RTG) is a gap defined between an uplink burst and a subsequent downlink burst.

The preamble is used for initial synchronization between the BS and the UE, cell search, frequency offset estimation and channel estimation. The FCH includes information regarding the length of the DL-MAP message and the coding scheme of the DL-MAP. The DL-MAP is a region where the DL-MAP message is transmitted. The DL-MAP message defines the access of a downlink channel. The DL-MAP message includes a configuration change count of a Downlink Channel Descriptor (DCD) and a BS identifier (ID). The DCD describes a downlink burst profile applied to a current frame. The downlink burst profile refers to the property of a downlink physical channel, and the DCD is periodically transmitted by the BS through the DCD message.

The UL-MAP is a region where the UL-MAP message is transmitted. The UL-MAP message defines the access of an uplink channel. The UL-MAP message includes a configuration change count of an Uplink Channel Descriptor (UCD), and an effective start time of the uplink allocation defined by the UL-MAP. The UCD describes an uplink burst profile. The uplink burst profile refers to the property of an uplink physical channel, and the UCD is periodically transmitted by the BS through the UCD message.

Hereinafter, a slot is a minimum data allocation unit and is defined by a time and a subchannel. The number of subchannels depends on a FFT size and time-frequency mapping. The subchannel includes a plurality of subcarriers and the number of subcarriers per subchannel varies according to a permutation method. The permutation indicates mapping of a logical subchannel to a physical subcarrier. The subchannel includes 48 subcarriers in full usage of subchannels (FUSC) and the subchannel includes 24 or 16 subcarriers in partial usage of subchannels (PUSC). A segment indicates at least one subchannel set.

In order to map data to physical subcarriers in a physical layer, two steps are generally performed. In a first step, data is mapped to at least one data slot on at least one logical subchannel. In a second step, the logical subchannel is mapped to the physical subchannel. This is called permutation. Reference document 1 discloses a permutation method such as FUSC, PUSC, Optimal-FUSC (O-FUSC), Optional-PUSC (O-PUSC) and Adaptive modulation and coding (AMC). A set of OFDMA symbols using the same permutation method is called a permutation zone and one frame includes at least one permutation zone.

The FUSC and the O-FUSC are used only for the downlink transmission. The FUSC is composed of one segment including all subchannel groups. The subchannels are mapped to the physical subcarriers distributed via all physical channels. The mapping is changed according to OFDMA symbols. The slot is composed of one subchannel on one OFDMA symbol. The methods of allocating pilots in the O-FUSC and FUSC are different from each other.

The PUSC is used for both the downlink transmission and the uplink transmission. In the downlink, each physical channel is divided into clusters including 14 contiguous subcarriers on two OFDMA symbols. The physical channel is mapped in the unit of six groups. In each group, the pilots are allocated to the clusters at fixed positions. In the uplink, the subcarriers are divided into tiles composed of four contiguous physical subcarriers on three OFDMA symbols. The subchannel includes six tiles. The pilots are allocated to corners of the tiles. The O-PUSC is used only for the uplink transmission and the tile is composed of three contiguous physical subcarriers on three OFDMA symbols. The pilots are allocated to the centers of the tiles.

Figure 4:
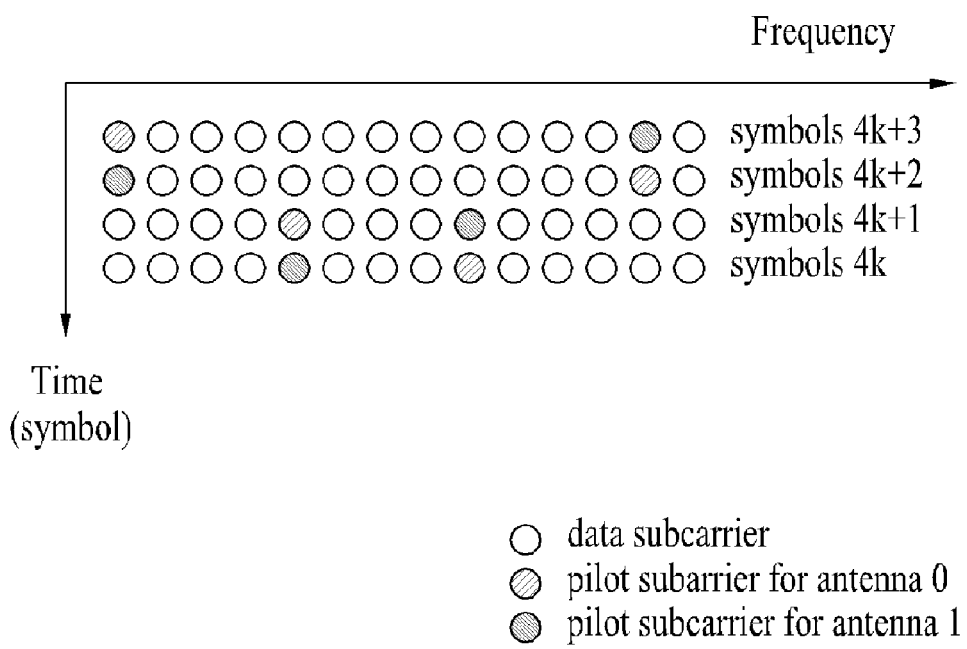
FIG. 4 shows a conventional pilot arrangement of two transmission antennas in partial usage of subchannels (PUSC).
Figure 5:
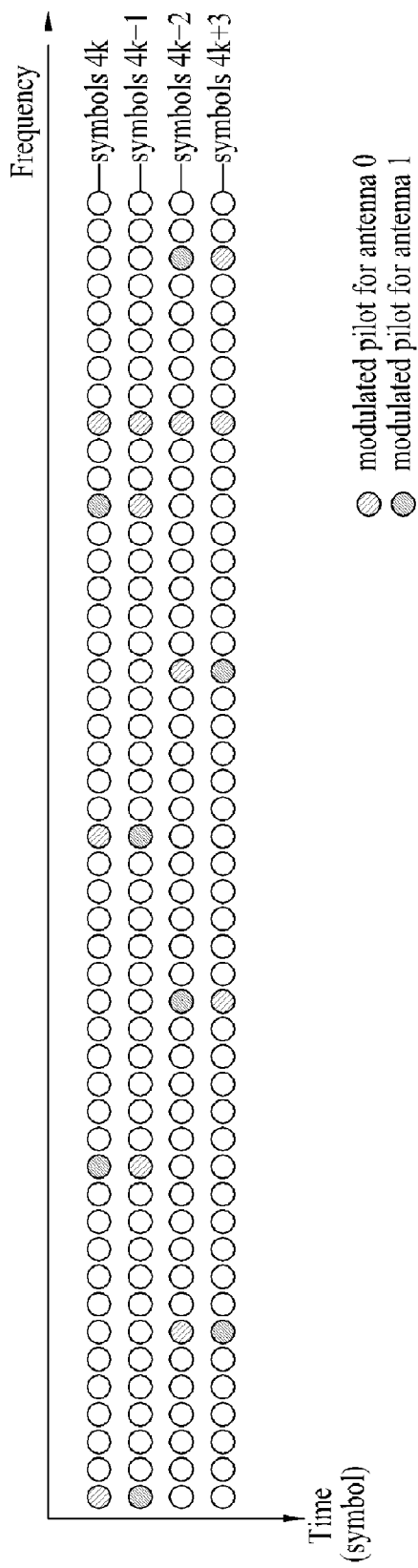
FIG. 5 shows a conventional pilot arrangement of two transmission antennas in full usage of subchannels (FUSC).
Figure 6:
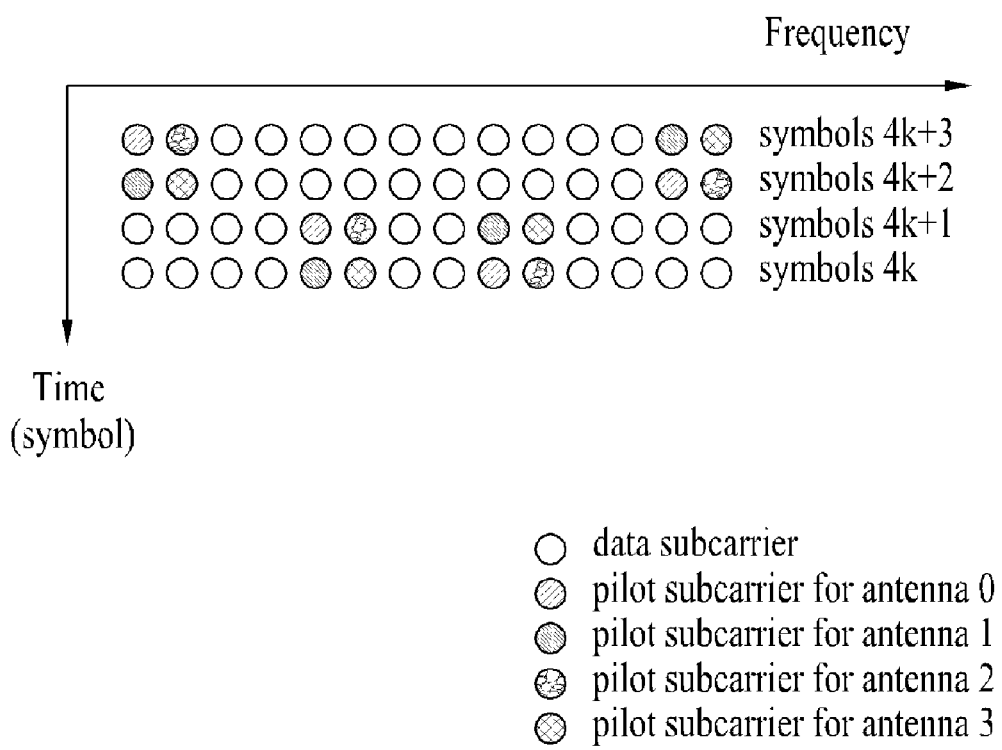
FIG. 6 shows a conventional pilot arrangement of four transmission antennas in the PUSC.
Figure 7B:
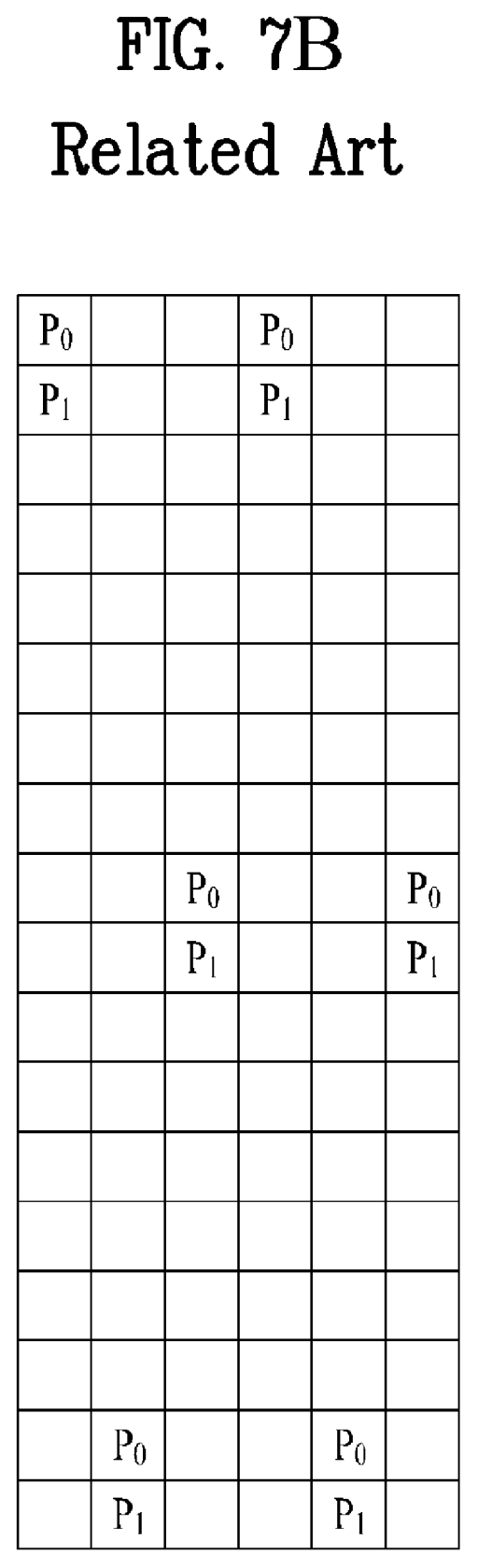

FIGS. 4 and 5 show a conventional pilot arrangement of two transmission antennas in the PUSC and FUSC, respectively. FIGS. 6 and 7A show a conventional pilot arrangement of four transmission antennas in the PUSC and FUSC, respectively. FIG. 7B shows a conventional pilot arrangement of two transmission antennas in FUSC. These figures refer to section 8.4.8.1.2.1.1, section 8.4.8.1.2.1.2, section 8.4.8.2.1, and section 8.4.8.2.2 of IEEE standard 802.16-2004/Cor1-2005 "Part 16: Air Interface for Fixed and Mobile Broadband Wireless Access Systems; Amendment 2: Physical and Medium Access Control Layers for Combined Fixed and Mobile Operation in Licensed Bands and Corrigendum 1" (hereinafter, referred to as Reference Document 2, the entire contents of which being incorporated herein by reference).

In reference document 2, there is also a conventional pilot subcarrier allocation structure in a system using 1 or 2 antennas (FIG. 7B).

In FIG. 7B for 1,2 stream, the location of pilot can be characterized by the following formula $$\_P_i(k, m) = 18k + \mathrm{mod}[16\mathrm{mod}(m, 3), 24] + \mathrm{mod}(i, 2)$$

$$\text{where } \begin{cases} i \in \{0, 1\}: \text{Antenna index} \\ m \in \{0, 1, \ldots\}: \text{OFDMA symbol index} \\ k \in \{0, 1, \ldots\}: \text{PRU index} \end{cases}$$

In FIGS. 4-7A/B, in the time domain there are 2 symbols/subchannel (or slot) and in the frequency domain there are 28 subcarriers. In FIGS. 4-7A/B, these subchannels/slots and subcarriers are shown in a repeating pattern.

Referring to conventional pilot arrangements of FIGS. 4 to 7A/B, the pilot overhead is large when the allocation of the subcarrier is performed according to the PUSC or the FUSC. In particular, the overhead is larger when one transmission antenna is used compared to when at least two transmission antennas is used, in consideration of pilot overhead per transmission antenna.

Table 1 shows the pilot overhead according to the number of transmission antennas in each conventional permutation method.

TABLE 1

| Number of transmission antennas | PUSC | FUSC | O-FUSC |
|---|---|---|---|
| 1 | 14.28% (14.28%) | 9.75% (9.75%) | 11.1% (11.1%) |
| 2 | 14.28% (7.14%) | 9.75% (4.78%) | 11.1% (5.55%) |
| 4 | 28.55% (7.14%) | 18.09% (4.52%) | 22.21% (5.55%) |

The pilot overhead is a value obtained by dividing the number of subcarriers allocated to the pilots by the number of all subcarriers which are used. The value in parenthesis indicates the pilot overhead per transmission antenna. Further, according to Reference Document 2, if four or three transmission antennas are used, mapping of the data to the subchannels is performed after puncturing or truncation with respect to channel encoded data.

Hereinafter, an efficient pilot allocation structure according to an embodiment of the present invention is described. In the following embodiment, the horizontal axis (index symbol 'j') denotes a set of OFDMA symbols in the time domain and the vertical axis (index symbol 'i') denotes the subcarriers in the frequency domain. P0, P1, P2, and P3 denote the pilot subcarriers corresponding to the antennas 1, 2, 3, and 4, respectively. The positions of the pilots for the antenna 1, 2, 3, and 4 may be exchanged to each other without departing from the principal of this embodiment. Further, the present invention can be applied to a MBS system (multicast broadcast system) as well as a unicast service system.

FIG. 8 is a pilot subcarrier allocation structure in a system using four antennas according to an embodiment of the present invention. Although the resource block unit of the structure shown in FIG. 8 is a form of a 18*6 matrix structure representing 18 subcarriers (vertical axis)*6 OFDMA symbols (horizontal axis), pilot subcarrier allocation structures with configurations other than the 18*6 matrix structure can be applied to a subframe or the whole frames.

The pilot subcarrier allocation structure of FIG. 8 differs from the conventional structures of FIGS. 4-7A/B in a variety of ways. For example, in the time domain the present invention uses 6 symbols/basic physical resource unit (PRU), whereas the prior art uses 2 symbols/PRU. In both schemes, the PRUs may be repeated. Furthermore, in the frequency domain, the present invention uses 18 subcarriers, whereas the prior art uses 28 subcarriers. Here, a PRU is substantially similar to a subchannel/slot of the prior art.

The present invention differs from the conventional structures by placing the pilot signals only in the first, second, fifth and sixth OFDMA symbol. One advantage of the present invention in the 1 or 2 antenna scenario is that the pilot signals are contained only in the first, second, fifth and sixth OFDMA symbol whereas in the prior art, the pilot symbols are contained in all OFDMA symbols. By limiting the placement of the pilot symbols to specific symbols, overhead is improved (reduced).

With the pilot subcarrier allocation structure of FIG. 8, data subcarriers other than pilot subcarriers are contiguously allocated so that the data subcarriers are contiguously paired by a multiple(s) of 2. As a result, a MIMO scheme of SFBC (space frequency block code) can be easily applied and common pilots and dedicated pilots are effectively applied.

Within each OFDMA symbol, the pilots for the transmission antennas are allocated at a spacing of a multiple(s) of 2 subcarriers (e.g. at a spacing of 4 subcarriers or 6 subcarriers) on the frequency axis for easy application of SFBC.

Pilots for each transmission antenna within each OFDMA symbol are repeatedly allocated at a spacing of 18 subcarriers on frequency axis.

In addition, the pilots for each transmission antenna are shifted by a predetermined number of subcarriers per adjacent OFDMA symbols that are allocated for pilots subcarriers. For example, referring to FIG. 8, the adjacent OFDMA symbols that are allocated for pilots subcarriers have the index number j of 0, 1, 4, and 5. For the pilots P0 for antenna 1 in this embodiment, the location of the pilots P0 is shifted downward by a spacing of 12 subcarriers (from index i=0 to index i=12) between OFDMA symbol index j=0 and j=1, the location of the pilots P0 is shifted upward by a spacing of 7 subcarriers (from index i=12 to index i=5) between OFDMA symbol index i=1 and i=4, and the location of the pilots P0 is shifted downward by a spacing of 12 carriers (from index i=5 to i=17) between OFDMA symbol index i=4 and i=5. Similar description is obviously applicable to each of pilots (P1, P2, P3) for the other transmission antennas (antenna 2, antenna 3, antenna 4).

It should be noted that pilots are not allocated for the third and fourth OFDMA symbols (i.e. OFDMA symbol index of j=2, 3) in a RU (resource unit) so as to improve the estimation performance for the performance of edge subcarrier pilots as well as to reduce pilot overhead. In addition, within each of the first, the second, the fifth, and the sixth OFDMA symbols (i.e. OFDMA symbol index of j=0, 1, 4, 5), a total of four pilots for the four antennas are allocated one by one. For example, in the first OFDMA symbol in FIG. 8, one pilot P0 for antenna 1, one pilot P1 for antenna 2, one pilot P2 for antenna 3, and one pilot P3 for antenna 4 are allocated along the frequency axis.

A part of the pilot subcarriers for this embodiment can be used for common pilots, and other part of the pilot subcarriers can be used for dedicated pilots. Otherwise, the whole of the pilot subcarriers can be used either for common pilots or for dedicated pilots.

In the pilot allocation structure shown in FIG. 8, the pilot allocation indexes for the antennas may be represented in detail as follows.

When $l_0 \in \{0,1,4,5\}$, where $l_0 = l \mod 6$, the pilot subcarrier allocated in the i-th antenna, the l-th OFDMA symbol, and k-th physical resource unit (PRU) is defined as follows:

$$Pilot_i(k,l) = 18k + 12 \cdot \{(l_0 + floor(i/2)) \mod 2\} + 5 \cdot \{(i + floor(l_0/4)) \mod 2\}$$

The pilot pattern shown in FIG. 8 may be equally and repeatedly applied to the time/frequency domain in the frame or the subframe.

The benefit of the previously described allocation scheme is shown in Table 2.

TABLE 2

| The number of Antennas | Pilot density regardless of permutation ways (Unified pilot pattern) |
|---|---|
| 1 | 3.703% |
| 2 | 7.407% (3.703% per stream) |
| 4 | 14.81% (3.703% per stream) |

In Table 2, the pilot overhead is a value obtained by dividing the number of subcarriers allocated to the pilots by the number of all subcarriers which are used. The value in parenthesis indicates the pilot overhead per transmission antenna. As can be seen by comparing Table 2 to Table 1, the allocation scheme of the present invention provides greater efficiency through reduced overhead.

The previous discussion relates to a 4 antenna scenario. However, the invention is not restricted to 4 antennas. In an 8 antenna scenario, the scheme shown in FIG. 8 would be repeated or used without repeating. In a 1 antenna scenario, pilot P0 would be used as a pilot, with pilots P1-P3 used for data. In a 2 antenna scenario, pilots P0-P1 would be used as pilot signals, with pilots p2-p3 used for data.

Another feature of the present invention is that the pilot signals are separated in the frequency domain by an even number of channels (e.g., 4 or 6). By separating the pilot symbols in this manner, it is possible to employ a space frequency block code (SFBC) scheme. Also, in the present invention is that the pilot signals are grouped as even pairs in the time domain. By group the pilot symbols in this manner, it is possible to employ an space time block code (STBC) scheme. Also, by including the pilot symbols for multiple antenna scenarios in a single OFDMA symbol (e.g., in the 4 antenna scenario, having P0-P3 in a common OFDMA symbol, rather than having P0-P1 in a first OFDMA symbol, and having P2-P3 in a next OFDMA symbol), improved power balancing may be obtained.

The previous discussion has included reference to OFDMA modulation. However, the present invention is also applicable to orthogonal frequency division multiplexing (OFDM) scenarios.

The previous discussion of the 4 antenna scenario is based on a matrix size of 18*6. However, the invention is not limited to this matrix size in the 4 antenna scenario. For example, the 4 antenna scenario may include a matrix size of 20*6, or 20*8, or another size. In these alternative matrices, the pilot symbols are constrained to occur in only 4 of the OFDMA symbols. Also, the location of the pilot symbols in the frequency domain may be offset in any matrix size, such that the pattern of pilot symbols is not restricted to begin in the first subcarrier.

In the previously described channel estimation, the estimation may be limited to consideration of channel effects measured by pilot symbols within a single PRU (e.g., considering pilot symbols within each 18*6 matrix separately.) However, in other embodiments, pilot symbols from multiple PRUs may be considered together.

In the previously described embodiments, pilot symbols P0, P1, P2 and P3 may or may not have identical bit patterns.

To efficiently support a SFBC MIMO scheme, the data subcarriers applied by the SFBC scheme should be contiguously paired in the frequency domain because a coherent channel condition is required across frequency domain for SFBC performance. Accordingly, the pilot pattern should support an allocation with an even number of data subcarriers in a given pilot structure. For a STBC case, the analysis can be applied in a similar manner spanning the time domain (even with OFDMA symbols).

Thus, one embodiment of the present invention includes a method of communicating with a wireless communication device. The method includes receiving an orthogonal frequency division multiple access (OFDMA) modulated signal transmitted from a 4 antenna multiple input/multiple output (MIMO) antenna system; demodulating the OFDMA signal to produce a resource block in a form of an 18*6 matrix representing 18 subcarriers and 6 OFDMA symbols; detecting four pilot symbols distributed across only four of the 6 OFDMA symbols, wherein within each OFDMA symbol containing pilot symbols, a first and a second occurring pilot symbol are separated by 4 subcarriers, the second and a third occurring pilot symbol are separated by 6 subcarriers, and the third and a fourth occurring pilot symbol are separated by 4 subcarriers; and performing channel estimation based on the detected four pilot symbols.

The above-described functions may be performed by a processor such as a microprocessor, a controller, a microcontroller or an application specific integrated circuit (ASIC) which is coded so as to perform the functions. The design, development and implementation of the code are apparent to those skilled in the art on the basis of the description of the present invention.

Thus, another embodiment of the present invention includes a mobile wireless communication device, including: a receiver configured to receive an orthogonal frequency division multiple access (OFDMA) modulated signal transmitted from a 4 antenna multiple input/multiple output (MIMO) antenna system; a demodulator operatively connected to the receiver and configured to demodulate the OFDMA signal to produce a resource block in a form of an 18*6 matrix representing 18 subcarriers and 6 OFDMA symbols; and a channel estimator operatively connected to the demodulator and configured to estimate channel characteristics based on detected pilot symbols, the channel estimator configured to detect four pilot symbols distributed across only four of the 6 OFDMA symbols, wherein within each OFDMA symbol containing pilot symbols, a first and a second occurring pilot symbol are separated by 4 subcarriers, the second and a third occurring pilot symbol are separated by 6 subcarriers, and the third and a fourth occurring pilot symbols are separated by 4 subcarriers.

A method of allocating pilot subcarriers according to the present invention is applicable to an IEEE 802.16m system. As described above, a basic principle such as pilot arrangement for equally allocating transmission power to antennas or pilot shift pattern setting is also applicable to other wireless communication systems by the same method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of communicating with a wireless communication device, the method comprising:

generating an orthogonal frequency division multiple access (OFDMA) signal; and transmitting the OFDMA signal from a multiple input/multiple output (MIMO) antenna system by using one or more resource blocks, each resource block being in a form of an 18*6 matrix representing 18 subcarriers and 6 OFDMA symbols, wherein four pilot signals corresponding to four antennas or streams are distributed across only a $1^{st}$, $2^{nd}$, $5^{th}$ and $6^{th}$ occurring OFDMA symbols of the 6 OFDMA symbols, wherein, within each of the $1^{st}$, $2^{nd}$, $5^{th}$ and $6^{th}$ occurring OFDMA symbols, a first occurring pilot subcarrier and a second occurring pilot subcarrier are separated by 4 subcarriers, the second occurring pilot subcarrier and a third occurring pilot subcarrier are separated by 6 subcarriers, and the third occurring pilot subcarrier and a fourth occurring pilot subcarrier are separated by 4 subcarriers, and wherein, within each of the $1^{st}$, $2^{nd}$, $5^{th}$ and $6^{th}$ occurring OFDMA symbols, the first to fourth occurring pilot subcarriers correspond to the four antennas or streams.

2. The method of claim 1, wherein the $1^{st}$ occurring OFDMA symbol includes pilot subcarriers P0, P1, P2, and P3, with pilot subcarriers P0, P1, P2 and P3 being the first, second, third and fourth occurring pilot subcarriers in the $1^{st}$ occurring OFDMA symbol.

3. The method of claim 2, wherein pilot subcarriers P2, P3, P0 and P1 are the first, second, third and fourth occurring pilot subcarriers in the $2^{nd}$ occurring OFDMA symbol.

4. The method of claim 1, wherein the $5^{th}$ occurring OFDMA symbol includes pilot subcarriers P0, P1, P2, and P3, and pilot subcarriers P1, P0, P3, and P2 are the first, second, third and fourth occurring pilot subcarriers in the $5^{th}$ occurring OFDMA symbol.

5. The method of claim 4, wherein pilot subcarriers P3, P2, P1, and P0 are the first, second, third and fourth occurring pilot subcarriers in the $6^{th}$ occurring OFDMA symbol.

6. A device used for a mobile wireless communication, comprising:

a signal generator configured to generate an orthogonal frequency division multiple access (OFDMA) signal; and a plurality of antennas configured to transmit the OFDMA signal by using one or more resource blocks, each resource block being in a form of an 18*6 matrix representing 18 subcarriers and 6 OFDMA symbols, wherein four pilot signals corresponding to four antennas or streams are distributed across only a $1^{st}$, $2^{nd}$, $5^{th}$ and $6^{th}$ occurring OFDMA symbols of the 6 OFDMA symbols, wherein, within each of the $1^{st}$, $2^{nd}$, $5^{th}$ and $6^{th}$ occurring OFDMA symbols, a first occurring pilot subcarrier and a second occurring pilot subcarrier are separated by 4 subcarriers, the second occurring pilot subcarrier and a third occurring pilot subcarrier are separated by 6 subcarriers, and the third occurring pilot subcarrier and a fourth occurring pilot subcarrier are separated by 4 subcarriers, and wherein, within each of the $1^{st}$, $2^{nd}$, $5^{th}$ and $6^{th}$ occurring OFDMA symbols, the first to fourth occurring pilot subcarriers correspond to the four antennas or streams.

7. The device of claim 6, wherein the $1^{st}$ occurring OFDMA symbol includes pilot subcarriers P0, P1, P2 and P3, with pilot subcarriers P0, P1, P2 and P3 being the first third and fourth occurring pilot subcarriers in the $1^{st}$ occurring OFDMA symbol.

8. The device of claim 7, wherein pilot subcarriers P2, P3, P0 and P1 are the first, second, third and fourth occurring pilot subcarriers in the $2^{nd}$ occurring OFDMA symbol.

9. The device of claim 6, wherein the $5^{th}$ occurring OFDMA symbol includes pilot subcarriers P0, P1, P2 and P3, and pilot subcarriers P1, P0, P3, and P2 are the first, second, third and fourth occurring pilot subcarriers in the $5^{th}$ occurring OFDMA symbol.

10. The device of claim 9, wherein pilot subcarriers P3, P2, P1, and P0 are the first, second, third and fourth occurring pilot subcarriers in the $6^{th}$ occurring OFDMA symbol.

* * * * *